United States Patent [19]

Swanson et al.

[11] Patent Number: 4,846,565
[45] Date of Patent: Jul. 11, 1989

[54] EMERGENCY PRETERMINATED CABLE APPARATUS

[75] Inventors: Steven E. Swanson; Arnold E. Gee, both of Williamsport, Pa.

[73] Assignee: GTE Products Corporation, Stamford, Conn.

[21] Appl. No.: 204,801

[22] Filed: Jun. 10, 1988

[51] Int. Cl.[4] .............................................. G02B 6/40
[52] U.S. Cl. .............................. 350/96.22; 350/96.21
[58] Field of Search ............... 350/96.20, 96.21, 96.22, 350/96.23

[56] References Cited

U.S. PATENT DOCUMENTS 4,666,240 5/1987 Caron et al. ..................... 350/96.20
4,685,764 8/1987 Hoffer et al. ..................... 350/96.20
4,702,551 10/1987 Coulombe ......................... 350/96.20
4,728,171 3/1988 Schofield et al. ................. 350/96.20

Primary Examiner—Frank Gonzalez
Attorney, Agent, or Firm—William H. McNeill

[57] ABSTRACT

An emergency fiber optic cable repair apparatus including a length of multi-fiber optical cable preterminated at both ends, the preterminated optical fibers at each end being spliced to respective splicing devices mounted upon a respective splice cradle positioned within a respective of two enclosures to each of which an end of a damaged fiber optic cable can be coupled so that the optical fibers at each end of such damaged cable can be spliced to a respective splice cradle.

14 Claims, 6 Drawing Sheets

EMERGENCY PRETERMINATED CABLE APPARATUS

BACKGROUND OF THE INVENTION

1. Field of the Invention

The present invention relates to an emergency predetermined cable apparatus which is useful in quickly coupling together the two ends of a severed fiber optic cable by using an independent fiber optic cable the individual fiber optics at both ends of which have been predetermined and coupled to respective enclosures and respective splice cradles therein for splicing such two ends of the severed fiber optic cable thereto.

2. Description of Prior Art

The use of fiber optic cable is becoming more prevalent for voice and data transmission service. However, the increased benefits and greater carrying capabilities of fiber optic cables have created various problems unique to fiber optics when a line is damaged or severed. For example, cost of restoration of fiber optic cable is very high and revenue loss incurred as a result of an inoperative cable can range between $10,000 to $100,000 per minute depending upon the degree of use and type of cable. These figures can be expected to increase with an increased use of fiber optic cables, an increase in the number of fibers per cable, and an increase in the speed of transmission.

In the past, most telephone operating companies developed individual restoration practices, utilizing many of the components already used in initial installations. Damaged or severed fiber optic cable were restored by terminating all ends of the cable, using standard off the shelf splice trays and cable enclosures, the technician providing his own cable sections and tools. In time, it became apparent that a more efficient means of restoration was needed and emergency restoration kits were developed. Such kits included factory terminated cable but were otherwise merely modified versions of the types previously used. The use of such kits is cost effective in that it reduces splicing time since half of the splicing and cable preparation is already done. However, although prior art predetermined cable kits therefore reduce cable downtown, such prior art kits utilize universal enclosures which makes cable entry time-consuming and difficult. In addition, the prior art kits often duplicate tools and supplies already owned by the operating company, are typically large and bulky, are not easy to terminate, and can be used only once.

It is highly desirable to provide an emergency preterminated cable apparatus which is user friendly; that is, easy to use.

It is further desirable to provide such apparatus which requires minimum training of the field technician.

It is also desirable to provide such apparatus wherein special skills and special tools are not required.

It is further desirable to provide such apparatus which can be operated by a single technician and which can be used on all cable types in the area.

Another desired feature is to provide such apparatus which is light in weight and compact and reasonably small in size so that it can readily be stored and the technician can easily carry it to the break point even if several hundred yards from the vehicle.

It is also desirable to provide such apparatus for restoring fiber optic cable service in the least amount of time at a minimum unit cost.

It is further desirable to provide such apparatus which can be used in an emergency situation and can be reused once a permanent restoration has been completed.

Another desired feature is that such apparatus be a completely self contained unit having everything needed except tools.

SUMMARY OF THE INVENTION

This invention achieves these and other results by providing an emergency preterminated cable apparatus for coupling a plurality of constituent first optical fibers extending from an end of a first fiber optic cable to a plurality of constituent second optical fibers extending from an end of a second fiber optic cable The apparatus includes a housing having means within for winding a length of a third fiber optic cable having a first end including a plurality of corresponding constituent first optical fibers, an end of each first optical fiber of the plurality of corresponding constituent first optical fibers extending from the first end and including a respective first splicing device, and an opposite second end including a plurality of corresponding constituent second optical fibers, an end of each optical fiber of the plurality of corresponding constituent second optical fibers extending from the second end and including a respective second splicing device. A first enclosure is provided containing a first splice tray, the first splice tray including at least one first splice cradle, said first enclosure having a first opening for permitting the plurality of corresponding constituent first optical fibers to extend into the enclosure. The first splice tray further includes at least one means for winding the plurality of corresponding constituent first optical fibers and directing each respective first splicing device to a first splice cradle. The first enclosure also includes a second opening for permitting the plurality of constituent first optical fibers of the first fiber optic cable to extend into the enclosure. The first splice tray also includes at least one other means for winding the plurality of constituent first optical fibers and directing each optical fiber of the plurality of constituent first optical fibers to the first splice cradle for splicing to a respective first splicing device. A second enclosure is also provided containing a second splice tray, the second splice tray including at least one second splice cradle. The second enclosure has a first opening for permitting the plurality of corresponding constituent second optical fibers to extend into the enclosure. The second splice tray also includes at least one means for winding the plurality of corresponding constituent second optical fibers and directing each respective second splicing device to a second splice cradle. The second enclosure also includes a second opening for permitting the plurality of constituent second optical fibers of the second fiber optic cable to extend into the enclosure. The second splice tray also includes at least one other means for winding the plurality of constituent second optical fibers and directing each optical fiber of the plurality of constituent second optical fibers to a second splice cradle for splicing to a respective second splicing device.

DESCRIPTION OF THE PREFERRED EMBODIMENT

Figure 1:
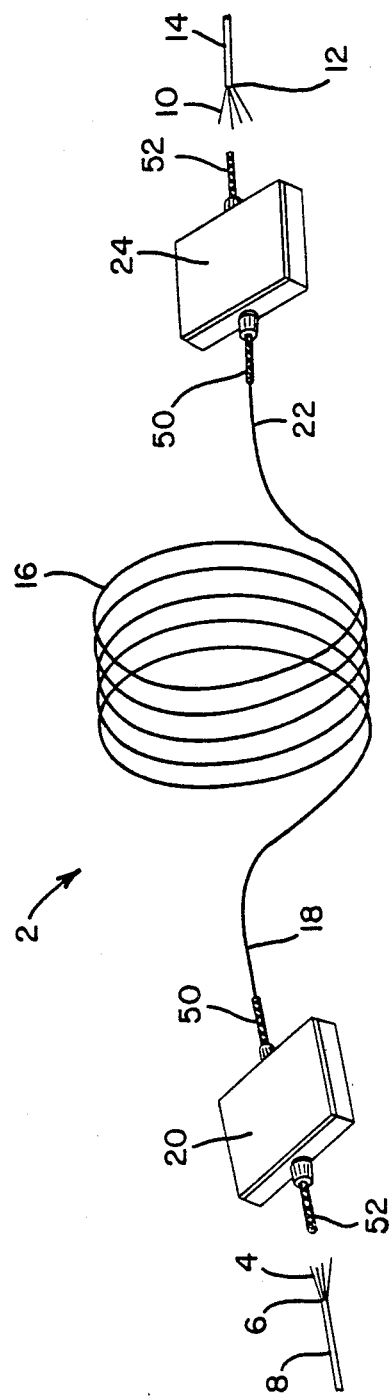
FIG. 1 is an exploded diagrammatic view of one embodiment of an emergency preterminated cable apparatus of the present invention.

The embodiment of this invention which is illustrated in the drawings is particularly suited for achieving the objects of this invention. FIG. 1 depicts an exploded diagrammatic view of an emergency preterminated cable apparatus 2 of the present invention in a field environment. The apparatus is for use in coupling together a severed fiber optic cable. In particular, the apparatus is for use in coupling a plurality of constituent first optical fibers 4 extending from an end 6 of a first fiber optic cable 8 to a plurality of constituent second optical fibers 10 extending from an end 12 of a second fiber optic cable 14, cables 8 and 14 constituting opposing portions of a severed fiber optic cable. The apparatus includes a third fiber optic cable 16 having a first end 18 coupled to a first enclosure 20 and a second end 22 coupled to a second enclosure 24 as described herein. Enclosures 20 and 24 include splicing members therein by means of which end 6 of cable 8 can be coupled to end 18 of cable 16 and end 12 of cable 14 can be coupled to end 22 of cable 16 as described herein.

Figure 2:
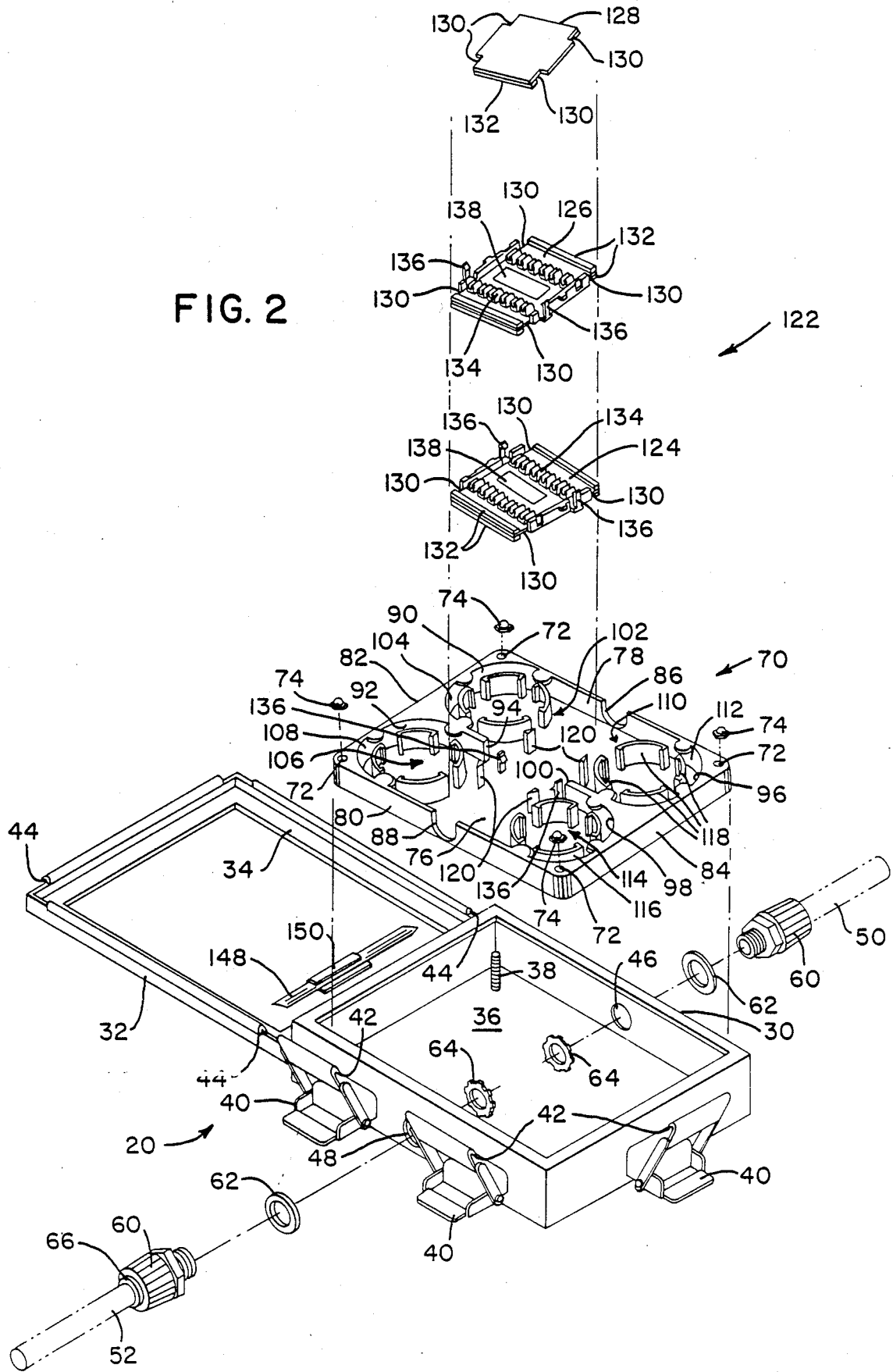
FIG. 2 is an exploded view in perspective of an enclosure of the present invention.

First enclosure 20 and second enclosure 24 are identical and therefore only first enclosure 20 is described herein with reference to FIG. 2. Enclosure 20 includes a box-like housing 30 having a lid 32 attached thereto by hinges (not shown). The housing and lid are preferably formed from 14 gauge steel. In order to properly seal housing 30 when the lid 32 is closed, a sealing member such as a rubber seal 34 is provided at the periphery of the inside face of the lid. The base 36 includes 4 upstanding bolts 38, one in each corner area of the housing, only one such bolt being shown in FIG. 2. A plurality of hinged clamps such as stainless steel clamps 40 are attached to various outside walls of housing 30. When the lid 32 is closed the hooked portion 42 of each clamp 40 can be pivoted to mate with corresponding hooked edges 44 of the lid and the lid pulled firmly in place by further pivoting such clamps 40, in a known manner. The enclosure has a first opening 46 and a second opening 48 in opposite walls of the housing 30.

Figure 3:
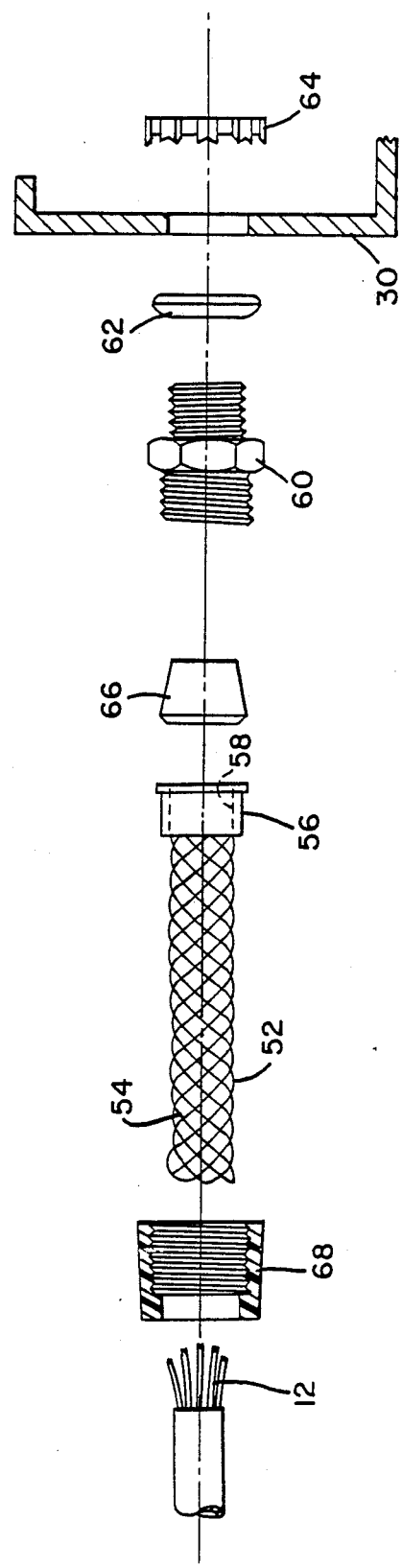
FIG. 3 is an exploded view of a strain relief grip assembly of the present invention.

The enclosure also has fastened thereto a first strain relief grip 50 which is concentric with first opening 46 and a second strain relief grip 52 which is concentric with second opening 48. First strain relief grip 50 and second strain relief grip 52 are identical and are fastened to housing 30 in the same manner, and therefore only second strain relief grip 52 is described herein with reference to FIG. 3. Second strain relief grip 52 is in the form of what is commonly referred to as a finger grip which includes a tubular structure braided from strands of wire 54 having a collar 56 with an opening 58 therethrough. Once a fiber optic cable is forced through the tubular structure and opening 58 from left to right in viewing FIG. 3, any axial movement of the cable from right to left will cause the braided portion to collapse upon the cable in a known manner to thereby prevent further such axial movement of the cable and thereby provide satisfactory strain relief. The strain relief grip is fastened to the housing 30 at opening 48 by first fastening a connector body 60 and metal clad sealing O-ring 62 to the housing 30 at opening 48 by means of locknut 64 and then coupling the strain relief grip to the connector body 60 using a rubber bushing 66 and compression nut 68, in a known manner. In addition to eliminating pull tension on the splice described herein, the strain relief grips control cable arc-of-bend, prevent cable pull-out, and provide a liquid-tight seal.

Enclosure 20 contains a first splice tray and enclosure 24 contains a second splice tray. Since such first and second splice trays are identical and are fastened to housing 30 in the same manner, only splice tray 70 of enclosure 20 is described herein with reference to FIG. 2. Splice tray 70 can be formed from polypropylene profax and includes a plurality of apertures 72 through which bolts 38 of housing 30 extend, the splice tray thereby being held in place within the housing by means of cap nuts 74 fastened to bolts 38. Splice tray 70 includes a base 76. The splice tray also includes a first wall 78, a second wall 80, a third wall 82, and a fourth wall 84. All of such walls extend away from the base 76, walls 82 and 84 joining walls 78 and 80 at opposite ends thereof. It will be apparent from viewing FIG. 2 that when the splice tray 70 is positioned in the housing 20, first wall 78 will be adjacent first opening 46 so that a cut away portion 86 is aligned with opening 46, and second wall 80 will be adjacent second opening 48 so that a cut away portion 88 is aligned with opening 48. Third wall 82 includes a first arcuate portion 90 which extends from first wall 78 and a second arcuate portion 92 which extends from second wall 80, arcuate portions 90 and 92 merging at 94. In a like manner, fourth wall 84 includes a third arcuate portion 96 opposite first arcuate portion 90 and extending from the first wall 78, and a fourth arcuate portion 98 opposite second arcuate portion 92 and extending from second wall 80, arcuate portions 96 and 98 merging at 100. A first hub 102 extends away from base 76 and is spaced from first arcuate portion 90 at 104, a second hub 106 extends away from base 76 and is spaced from second arcuate portion 92 at 108, a third hub 110 extends away from base 76 and is spaced from third arcuate portion 96 at 112, and a fourth hub 114 extends away from base 76 and is spaced from fourth arcuate portion 98 at 116. In the embodiment of FIG. 2, hubs 102, 106, 110 and 114 are formed by a plurality of circumferentially spaced arcuate portions of a cylindrical wall having a predetermined bend radius R shown in FIG. 4 to accommodate the winding of optical fibers as described herein to minimize undesirable attenuation. For example, hub 110 includes such circumferentially spaced arcuate portions 118.

Each first and second splice tray of first enclosure 20 and second enclosure 24, respectively, also includes at least one splice cradle guide post. For example, splice tray 70 includes at least one splice cradle guide post 120 extending away from base 76, four such posts 120 being depicted in the embodiment of FIG. 2. Each first and second splice tray of first enclosure 20 and second enclosure 24, respectively, further includes at least one splice cradle, and in the preferred embodiment each splice tray includes a plurality of stacked splice cradles. For example, splice tray 70 includes a plurality of stacked splice cradles generally designated 122 including a lower splice cradle 124 and an upper splice cradle 126. A cover 128 is also provided for the stacked splice cradles. Although not necessary, such splice cradles can be formed from a polypropylene profax material. Each splice cradle and cover includes at least one splice cradle guide surface, each of which corresponds to a respective splice cradle guide post 120 to facilitate the proper positioning of the splice cradles and cover relative to the base 76 of the splice tray 70. For example, splice cradles 124 and 126 and cover 128 include guide surfaces 130 which mate with respective posts 120. In the embodiment of FIG. 2 splice cradles 124 and 126, and cover 128 include spacers 132 attached to select opposing edges, the spacers being formed from a resilient foam-like material. The splice cradles include a plurality of spaced bosses 134 which hold splices in place in a known manner as described herein. Means are associated with base 76 and with each splice cradle for attaching the splice cradles and cover together and to the base. For example, base 76 and splice cradles 124 and 126 include resilient snap members 136 which snap into place against a corresponding surface of an adjacent splice cradle or cover to hold such splice cradle and cover in place in a known manner as the stacked splice cradles and cover are aligned relative to posts 120 and positioned relative to base 76. Labels 138 are also applied to identify respective splice bosses.

Figure 4:
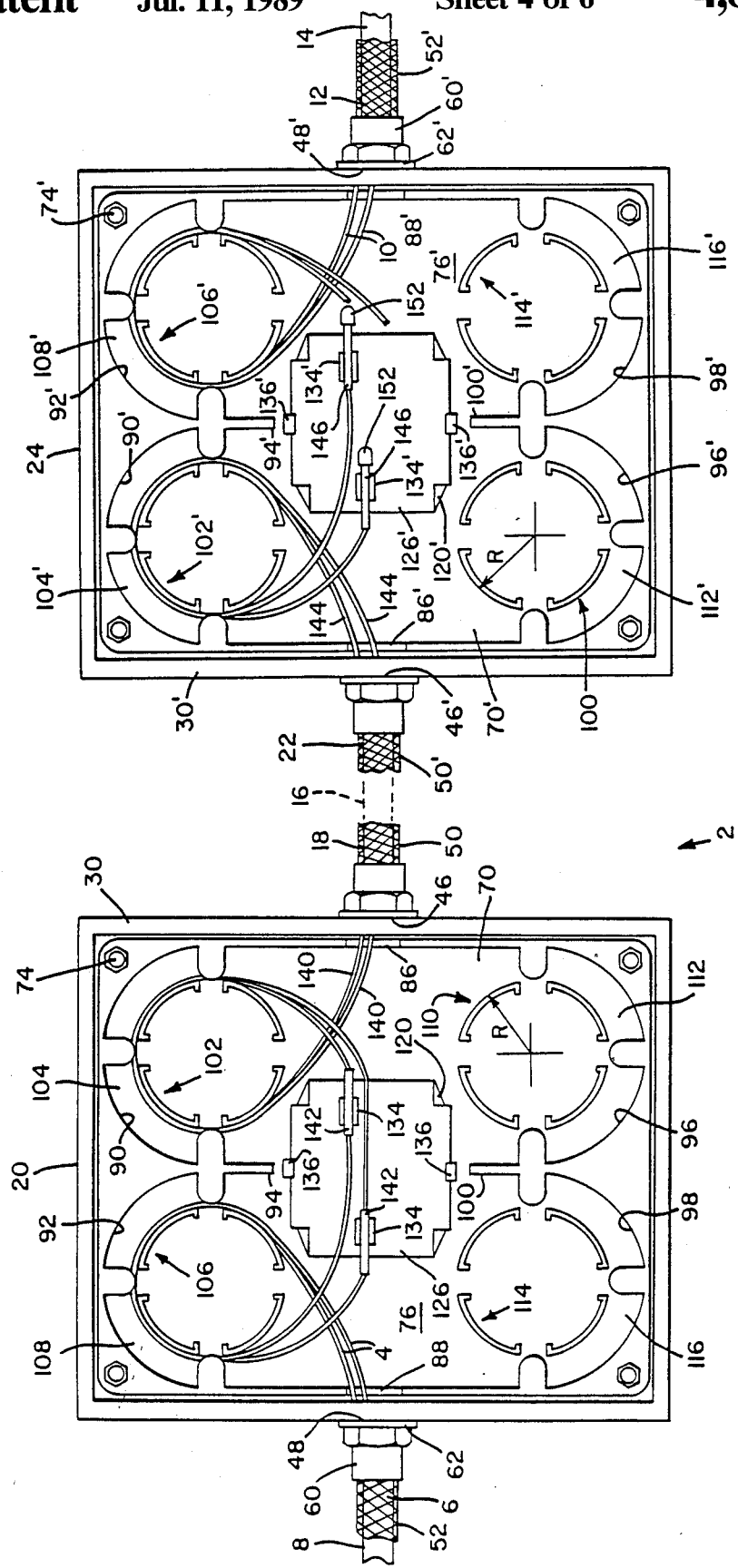
FIG. 4 is a plan view of the apparatus depicted in FIG. 1.

FIG. 4 depicts the emergency preterminated cable apparatus thus far described in a field environment during the splicing operation. In order to simplify this view, the box-like housings 30 are shown without the lids 32, only one splice cradle is depicted in each housing 30, and only two spaced bosses 134 and no labels 138 are depicted with respect to each such splice cradle. In addition, like numbers for enclosures 20 and 24 have been primed when applied to enclosure 24. Referring to FIG. 4, the emergency preterminated cable apparatus 2 is for coupling a plurality of constituent first optical fibers 4 extending from an end 6 of a first fiber optic cable 8 to a plurality of constituent second optical fibers 10 extending from an end 12 of a second fiber optic cable 14. A length of a third fiber optic cable 16 includes a first end 18 including a plurality of corresponding constituent first optical fibers 140, an end of each optical fiber of such plurality of corresponding constituent first optical fibers 140 extending from first end 18 of the cable 16 and including a respective first splicing device 142. In the preferred form of the present invention, the fibers 140 have been terminated and coupled to a respective splicing device 142 at the factory in a known manner. The fiber optic cable 16 also includes an opposite second end 22 including a plurality of corresponding constituent second optical fibers 144, an end of each optical fiber of the plurality of corresponding constituent second optical fibers 144 extending from second end 22 of the cable 16 and including a respective second splicing device 146. In the preferred form of the present invention, the fibers 144 have also been terminated and coupled to a respective splicing device 146 at the factory in a known manner.

The first enclosure 20 contains a first splice tray 70 which includes at least one first splice cradle 126. First enclosure 20 has a first opening 46 for permitting the plurality of corresponding constituent first optical fibers 140 to extend into the first enclosure 20. The first splice tray 70 of first enclosure 20 includes at least one means for winding the plurality of corresponding constituent first optical fibers 140 and directing each respective first splicing device 142 coupled thereto to splice cradle 126. In particular, optical fibers 140 are shown in FIG. 4 as being wound about hub 102 as many times as is necessary to take up the slack, and then directed towards the splice cradle 126 so that the splicing devices 142 can be attached to the splice cradle 126 by being pinched between a respective set of bosses 134 in a known manner. Typically, cable 16 will contain 12 to 48 fibers and can go to at least as high as 144 fibers. This explains the presence of hubs 102 and 110, and the use of a plurality of stacked splice cradles 126 as depicted in FIG. 2. In such fiber-dense fiber optic cables some of the individual fibers 140 will be wound about hub 102 and others will be wound about hub 110. The ends of such fibers will be coupled to respective splicing devices 142 in the same splice cradle or in different splice cradles in a stack of splice cradles as depicted in FIG. 2. It will be understood by those skilled in the art that the present invention contemplates any desired number of splice cradles forming a stack of splice cradles as described herein. First enclosure 20 also has a second opening 48 for permitting the plurality of constituent first optical fibers 4 of the first fiber optic cable 8 to extend into enclosure 20. The first splice tray 126 further includes at least one other means for winding the plurality of constituent first optical fibers 4 and directing each respective first optical fiber 4 to a splice cradle 126 for splicing to a respective first splicing device 142. In particular, optical fibers 4 are shown in FIG. 4 as being wound about hub 106 as many times as is necessary to take up the slack, and then directed towards the splice cradle 126 so that the fibers 4 can be coupled to a respective splicing device 142 in a known manner. As is the case regarding fibers 140, in fiber-dense fiber optic cables as discussed above, some of such fibers 4 will be wound about hub 106 and others about hub 114, the ends being coupled to a splicing device 142 in a particular splice cradle in a stack of splice cradles, as required to couple a fiber 4 to the appropriate corresponding fiber 140. It should be noted that although fibers 140 have been preterminated and coupled to respective splicing devices 142 at the factory, the fibers 4 are caused to be passed through opening 48, wound about hub 106 and coupled to splicing device 142 at the site of the portion 8 of the severed cable. As will be apparent to those skilled in the art, the other portion 14 of the severed cable is fastened within enclosure 24, the connecting fiber optic cable 16 thereby effectively rejoining cable 8 to cable 14. For purposes of illustration, the optic fibers 4 are shown in FIG. 4 as already having been coupled to splicing device 142 by the field technician at the site of the severed cable. For purposes of illustration, in enclosure 24 fibers 10 are shown as not yet having been coupled to respective splicing devices 146.

Second enclosure 24 contains a second splice tray 70' including at least one splice cradle 126'. Second enclosure 24 has a first opening 46' for permitting the plurality of corresponding constituent second optical fibers 144 to extend into the second enclosure 24. The second splice tray 70' of second enclosure 24 includes at least one means for winding the plurality of corresponding constituent second optical fibers 144 and directing each respective second splicing device 146 coupled thereto to splice cradle 126'. In particular optical fibers 144 are shown in FIG. 4 as being wound about hub 102' to take up the slack, and then directed towards splice cradle 126' so that the splicing devices 146 can be attached to splice cradle 126' by being pinched between a respective set of bosses 134' in a known manner. Second enclosure 24 also has a second opening 48' for permitting the plurality of constituent second optical fibers 10 of the second fiber optical cable 14 to extend into the second enclosure 24. The second splice tray 70' further includes at least one other means for winding the plurality of constituent second optical fibers 10 and directing each respective second optical fiber 10 to a splice cradle 126' for splicing to a respective second splicing device 146. In particular, optical fibers 10 are shown in FIG. 4 as being wound about hub 106' to take up the slack, and then directed towards the splice cradle 126' so that the fibers 10 can be coupled to a respective splicing device 146 in a known manner. As with respect to first enclosure 20, the second enclosure 24 can include pairs of hubs 102', 110' and 106', 114' and a stack of stackable splice cradles. It should be noted that as with respect to enclosure 20, the fibers 144 of enclosure 24 have been preterminated and coupled to respective splicing devices 146 at the factory. Also as with respect to enclosure 20, the fibers 10 are caused to be passed through opening 48', wound about hub 106', and coupled to presplicing device 146 at the site of the portion 14 of the severed cable. To this end, the stick 148 depicted in FIG. 2 as being clipped to lid 32 by a clip 150 is removed from the lid and used to remove a splicing device 146 from splice cradle 126'. This is accomplished by positioning the stack between a boss 134' and such splicing device 146 and using the stick as a lever to urge such splicing device 146 from between the pair of opposing bosses 134' which are holding such splicing device 146 in place. Then the cap 152 is removed from the end of the tubular splicing device 146 and a respective optical fiber 10 is coupled to the splicing device 146 in a known manner, including the step of inserting such optical fiber 10 into the tubular splicing device.

Figure 5:
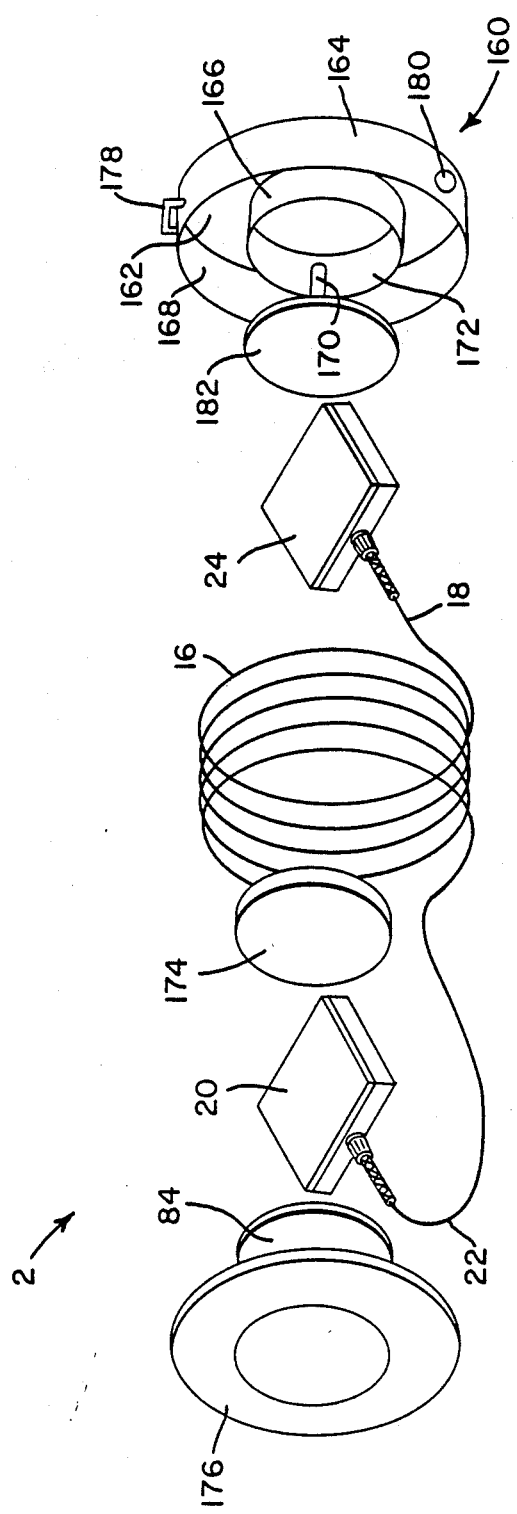
FIG. 5 is an exploded diagrammatic view of the embodiment of FIG. 1 including a housing; and, FIG. 6 is a perspective view of a modification of the housing of FIG. 5.
Figure 6:
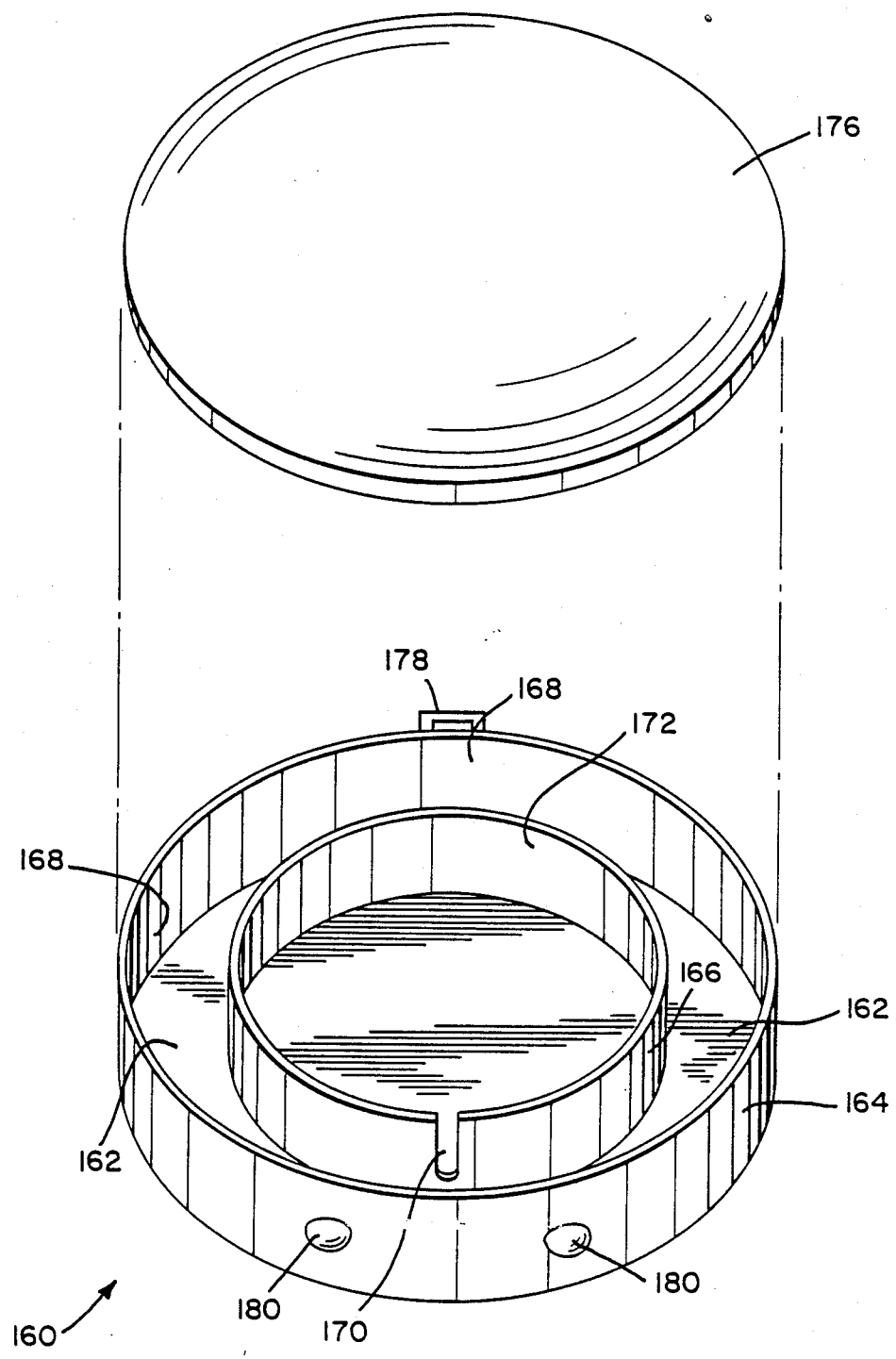

Preferably the emergency preterminated cable apparatus 2 includes some form of housing which is readily storable in the vehicle used by the field technician and by means of which the technician can carry the repair equipment to the site of the severed or otherwise damaged fiber optic cable. FIGS. 5 and 6 depict a preferred form of such a housing 160 for containing the length of cable 16 and the first enclosure 20 and second enclosure 24. Such housing 160 comprises a base 162 having an outer cylindrical wall 164 and a concentric inner cylindrical wall 166 each extending vertically from the base. The concentric inner cylindrical wall forms a hub for winding the length of cable 16 about, such wound cable thereby resting in the space 168 between wall 164 and wall 166. The concentric inner cylindrical wall includes an elongated aperture 170 therethrough, the first enclosure 20 and second enclosure 24 being positioned within cavity 172 formed by wall 166. When so positioned within cavity 172, the first end 18 and second end 22 of cable 16 will extend through aperture 170 to a respective enclosure 20 and 24. Preferably, a spacer 174 is positioned in cavity 172 between first enclosure 20 and second enclosure 24, and the housing 160 will include a lid 176, a handle 178 and anti-roll legs 180. Spacer 174 can be an open cell foam formed from a polyether grade urethane in a known manner. In order to provide alternate access, the drum-like housing 160 can be provided with a pop-out circular portion 182 and the lid 176 can be provided with a similar pop-out circular portion 184, shown only in FIG. 5. The drum-like housing 160 and lid 176 preferably form a fiber drum which is water resistant.

In operation, once the damaged fiber optic cable has been located the damaged section is cut out. For example, ten feet of cable can be cut out on each side of the damaged portion of the cable. Then the optical fibers 4 at end 6 of the remaining portion 8 of the damaged cable are exposed. The fibers 4 are fed into enclosure 20 through opening 48 and the brushing 66 and strain relief grip 52 are slid into position and fastened in place. Select of such fibers 4 are then wound about respective select hubs 106, 114 of enclosure 20. A splicing device 142 is then removed from a splice cradle of enclosure 20 using stick 148 and a fiber 4 is spliced thereto. The splicing device 142 is then snapped back into position in the splice cradle. This process is repeated for the remaining fibers 4 until each fiber has been spliced to a respective splicing device 142. The same procedure is followed with respect to the optical fibers 10 at end 12 of the remaining portion 14 of the damaged cable vis-a-vis enclosure 24. The various steps involved in preparing the optical fibers 4 and 10 such as cleaning, cutting, cleaving, and splicing such fibers in the splicing devices 142, 146, respectively, against corresponding preterminated fibers 140, 144, respectively, are well known in the art of splicing optical fibers and are not described in any further detail herein. By providing an emergency preterminated cable apparatus as described herein a fast and effective means of temporary restoration for damaged fiber optic cable is provided which ensures minimum system downtime. The apparatus is compact, lightweight, yet rugged, field-ready, and quick to deploy. The enclosures 20 and 24 accommodate ease of optical fiber entry, and reusability when the temporarily repaired cable is permanently restored and the emergency preterminated cable apparatus removed from the site.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. An emergency preterminated cable apparatus for coupling a plurality of constituent first optical fibers extending from an end of a first fiber optic cable to a plurality of constituent second optical fibers extending from an end of a second fiber optic cable, comprising:

a length of a third fiber optic cable having a first end including a plurality of corresponding constituent first optical fibers, an end of each optical fiber of said plurality of corresponding constituent first optical fibers extending from said first end and including a respective first splicing device, and opposite second end including a plurality of corresponding constituent second optical fibers, an end of each optical fiber of said plurality of corresponding constituent second optical fibers extending from said second end and including a respective second splicing device;

a first enclosure containing a first splice tray, said first splice tray including at least one first splice cradle, said first enclosure having a first opening for permitting said plurality of corresponding constituent first optical fibers to extend into said enclosure, said first splice tray further including at least one means for winding said plurality of corresponding constituent first optical fibers and directing each respective first splicing device to said at least one first splice cradle, said first enclosure having a second opening for permitting said plurality of constituent first optical fibers of said first fiber optic cable to extend into said enclosure, said first splice tray further including at least one other means for winding said plurality of constituent first optical fibers and directing each optical fiber of said plurality of constituent first optical fibers to said at least one first splice cradle for splicing to a respective first splicing device; and, wherein a second enclosure containing a second splice tray, said second splice tray including at least one second splice cradle, said second enclosure having a first opening for permitting said plurality of corresponding constituent second optical fibers to extend into said enclosure, said second splice tray further including at least one means for winding said plurality of corresponding constituent second optical fibers and directing each respective second splicing device to said at least one second splice cradle, said second enclosure having a second opening for permitting said plurality of constituent second optical fibers of said second fiber optic cable to extend into said enclosure, said second splice tray further including at least one other means for winding said plurality of constituent second optical fibers and directing each optical fiber of said plurality of constituent second optical fibers to said at least one second splice cradle for splicing to a respective second splicing device.

2. The emergency preterminated cable apparatus of claim 1 wherein said first splice tray and said second splice tray each respectively comprise a base, a first wall extending away from said base and being adjacent a first opening, a second wall opposite said first wall and extending away from said base and being adjacent a second opening, a third wall extending away from said base and joining said first and second walls and including a first arcuate portion extending from said first wall and a second arcuate portion extending from said second wall, and a fourth wall opposite said third wall and extending away from said base and joining said first and second walls and including a third arcuate portion opposite said first arcuate portion and extending from said first wall and a fourth arcuate portion opposite said second arcuate portion and extending from said second wall, a first hub extending away from said base and being spaced from said first arcuate portion, a second hub extending away from said base and being spaced from said second arcuate portion, a third hub extending away from said base and being spaced from said third arcuate portion, and a fourth hub extending away from said base and being spaced from said fourth arcuate portion, said first and third hubs forming said winding and directing means for respective of said plurality of constituent first and second optical fibers of said first and second fiber optic cable, and said second and fourth hubs forming said winding and directing means for respective of said plurality of corresponding constituent first and second optical fibers of said third fiber optic cable.

3. The emergency preterminated cable apparatus of claim 2 wherein said at least one first splice cradle includes a first plurality of stacked splice cradles and said at least one second splice cradle includes a second plurality of stacked splice cradles.

4. The emergency preterminated cable apparatus of claim 3 wherein said first and second enclosure each have fastened thereto a respective first strain relief grip each of which is concentric to a respective of said first openings, and further wherein said first and second enclosure each have fastened thereto a respective second strain relief grip each of which is concentric to a respective of said second openings.

5. The emergency preterminated cable apparatus of claim 4 wherein each of said hubs are formed by a plurality of circumferentially spaced arcuate portions of a cylindrical wall having a predetermined bend radius.

6. The emergency preterminated cable apparatus of claim 5 wherein said first arcuate portion merges with said second arcuate portion, and said third arcuate portion merges with said fourth arcuate portion.

7. The emergency preterminated cable apparatus of claim 6 wherein said first and second enclosure each include at least one splice cradle guide post extending away from a respective base and further wherein each splice cradle of a respective plurality of stacked splice cradles includes at least one corresponding splice cradle guide surface.

8. The emergency preterminated cable apparatus of claim 7 wherein said first and second enclosure each include respective means associated with a respective base and with a respective splice cradle of a respective plurality of stacked splice cradles for attaching each respective splice cradle to a respective base.

9. The emergency preterminated cable apparatus of claim 8 further including a housing for containing said length of a third fiber optic cable, said first enclosure and said second enclosure.

10. The emergency preterminated cable apparatus of claim 9 wherein said housing comprises a base having an outer cylindrical wall and a concentric inner cylindrical wall each extending vertically from said base, said concentric inner cylindrical wall providing a hub for winding said length of said third fiber optic cable.

11. The emergency preterminated cable apparatus of claim 10 wherein said concentric inner cylindrical wall includes an aperture therethrough and further wherein said first enclosure and said second enclosure are positioned within a cavity formed by said inner cylindrical wall, said first end of said third fiber optic cable and said second end of said third fiber optic cable extending through said aperture to a respective first and second enclosure.

12. The emergency preterminated cable apparatus of claim 11 further including a spacer positioned in said cavity and between said first enclosure and said second enclosure.

13. The emergency preterminated cable apparatus of claim 12 further including a housing lid.

14. An emergency preterminated cable apparatus for coupling a plurality of constituent first optical fibers extending from an end of a first fiber optic cable to a plurality of constituent second optical fibers extending from an end of a second fiber optic cable, comprising:
a housing;
means within said housing for winding a length of a third fiber optic cable having a first end including a plurality of corresponding constituent first optical fibers, an end of each fiber optical fiber of said plurality of corresponding constituent first optical fibers extending from said first end and including a respective first splicing device, and an opposite second end including a plurality of corresponding constituent second optical fibers, an end of each fiber optical fiber of said plurality of corresponding constituent second optical fibers extending from said second end and including a respective second splicing device;

a first enclosure containing a first splice tray, said first splice tray including at least one first splice cradle, said first enclosure having a first opening for permitting said plurality of corresponding constituent first optical fibers to extend into said enclosure, said first splice tray further including at least one means for winding said plurality of corresponding constituent first optical fibers and directing each respective first splicing device to said at least one first splice cradle, said first enclosure having a second opening for permitting said plurality of constituent first optical fibers of said first fiber optic cable to extend into said enclosure, said first splice tray further including at least one other means for winding said plurality of constituent first optical fibers and directing each optical fiber of said plurality of constituent first optical fibers to said at least one first splice cradle for splicing to a respective first splicing device; and, a second enclosure containing a second splice tray, said second splice tray including at least one second splice cradle, said second enclosure having a first opening for permitting said plurality of corresponding constituent second optical fibers to extend into said enclosure, said second splice tray further including at least one means for winding said plurality of corresponding constituent second optical fibers and directing each respective second splicing device to said at least one second splice cradle, said second enclosure having a second opening for permitting said plurality of constituent second optical fibers of said second fiber optic cable to extend into said enclosure, said second splice tray further including at least one other means for winding said plurality of constituent second optical fibers and directing each optical fiber of said plurality of constituent second optical fibers to said at least one second splice cradle for splicing to a respective second device.

* * * * *